United States Patent
Bolgar

(10) Patent No.: US 11,834,958 B2
(45) Date of Patent: Dec. 5, 2023

(54) ROTOR ASSEMBLY

(71) Applicant: ROLLS-ROYCE plc, London (GB)

(72) Inventor: Crispin D Bolgar, Nottingham (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/144,179

(22) Filed: Jan. 8, 2021

(65) Prior Publication Data
US 2021/0246789 A1    Aug. 12, 2021

(30) Foreign Application Priority Data

Feb. 7, 2020   (GB) ..................................... 2001689

(51) Int. Cl.
| | | |
|---|---|---|
| F01D 5/06 | (2006.01) | |
| F01D 11/00 | (2006.01) | |
| F01D 5/08 | (2006.01) | |

(52) U.S. Cl.
CPC ............ *F01D 5/066* (2013.01); *F01D 5/087* (2013.01); *F01D 11/001* (2013.01); *F01D 11/003* (2013.01)

(58) Field of Classification Search
CPC ...... F01D 11/00; F01D 11/001; F01D 11/003; F01D 11/005; F01D 11/006; F01D 5/06; F01D 5/066
See application file for complete search history.

(56) References Cited

U.S. PATENT DOCUMENTS

| | | | | |
|---|---|---|---|---|
| 2,356,605 A | * | 8/1944 | Meininghaus | ............ F01D 5/06 |
| | | | | 416/193 A |
| 3,356,339 A | * | 12/1967 | Thomas | .................. F01D 5/066 |
| | | | | 416/198 A |

(Continued)

FOREIGN PATENT DOCUMENTS

| | | |
|---|---|---|
| EP | 0169801 A1 | 1/1986 |
| EP | 1780380 A2 | 5/2007 |

(Continued)

OTHER PUBLICATIONS

European search reported dated Jun. 9, 2021, issued in EP Application No. 21150449.

(Continued)

*Primary Examiner* — Justin D Seabe
(74) *Attorney, Agent, or Firm* — Barnes & Thornburg LLP

(57) ABSTRACT

The present disclosure relates to a rotor assembly for a gas turbine engine, the rotor assembly comprising a first rotor stage having a first disc portion with a peripheral first rim portion and a second rotor stage, the second rotor stage having a second disc portion with a peripheral second rim portion. The second rotor stage is axially adjacent and downstream of the first rotor stage and the second rim portion has an axial extension extending towards the first rim portion such that the axial extension of the second rim portion defines a rotor drum cavity between the first and second disc portions. The second rotor stage further comprises a drive arm extending within the drum cavity to the first disc portion, the drive arm being connected to the first disc portion by at least one connector. The drive arm divides the drum cavity into radially outer rim cavity portion and a radially inner main cavity portion. The rotor assembly further comprises a rim seal located between the axial extension of the second rim portion and the first rim portion, and a pressure equalisation path extending from the rim cavity portion to the main cavity portion.

16 Claims, 4 Drawing Sheets

(56) References Cited

U.S. PATENT DOCUMENTS

| | | | | |
|---|---|---|---|---|
| 3,689,177 | A | * | 9/1972 | Klassen ................ F01D 5/3007 416/198 A |
| 4,103,899 | A | | 8/1978 | Turner |
| 4,526,508 | A | * | 7/1985 | Antonellis ............ F01D 11/001 416/198 A |
| 5,350,278 | A | * | 9/1994 | Burge ..................... F01D 5/066 416/198 A |
| 6,568,692 | B2 | * | 5/2003 | Kolodziej ............ F16J 15/0887 277/614 |
| 7,934,901 | B2 | * | 5/2011 | Moniz ...................... F02K 3/06 415/115 |
| 2018/0306198 | A1 | * | 10/2018 | Motsch .............. F04D 29/5846 |

FOREIGN PATENT DOCUMENTS

| | | | |
|---|---|---|---|
| EP | 3392463 A1 | 10/2018 | |
| GB | 1125920 A | 9/1968 | |
| WO | WO-2005052321 A1 * | 6/2005 | ............. F01D 5/066 |

OTHER PUBLICATIONS

Great Britain search report dated Jul. 3, 2020, issued in Great Britain patent application No. 2001689.5.

\* cited by examiner

ROTOR ASSEMBLY

CROSS-REFERENCE TO RELATED APPLICATIONS

This specification is based upon and claims the benefit of priority from UK Patent Application Number GB2001689.5 filed on 7$^{th}$ of Feb. 2020, the entire contents of which are incorporated herein by reference.

BACKGROUND

Technical Field

The present disclosure relates to a rotor assembly, in particular a compressor assembly such as a high-pressure compressor assembly having multiple adjoined and connected rotor/compressor stages.

Description of the Related Art

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

As shown in FIG. 4, each compressor 14, 15 comprises multiple stages extending between an upstream end (proximal the fan) and a downstream end (distal the fan).

Each stage includes a rotor disc 100a, 100b having a peripheral rim 101a, 101b and multiple circumferentially arranged blades 102a, 102b that are either integral with the rim 101a, 101b of the rotor disc 100a, 100b or affixed to the rim 101a, 101b of the rotor disc 100a, 100b, followed by multiple stator vanes 103 attached to a stationary ring (not shown). The stator vanes may be shrouded or cantilevered.

Each rotor disc 100a, 100b includes a respective axial extension 104a, 104b, the axial extensions defining a drum cavity 105. In order to connect adjacent stages, a drive arm 106 is provided which extends from the axial extension 104b towards the rotor disc 104a of the adjacent stage. The free end of the drive arm 106 is connected to the adjacent rotor disc 104a by a plurality of circumferentially arranged bolts or tie bars 107.

The drive arm 106 section divides the drum cavity into a radially outer (rim) cavity portion 108 and a radially inner (main) cavity portion 109. The rim cavity portion 108 is at the pressure of the gas flow path (in which the blades 102a, 102b and vanes 103 are mounted). This means that the bolts/tie bars 107 not only have to maintain the structural integrity of the connection between the stages (under high axial loads), they also have to seal the gas path. The pressure in the rim cavity portion 108 exerts a significant proportion (20-30%) of the total axial load on the bolts/tie bars 107.

The high axial loads on the bolts/tie bars 107 mean that a high number of bolts/tie bars 107 have to be used which increases the weight of the compressor and/or highest strength bolt/tie bar material has to be used which increases the cost of the compressor.

SUMMARY

According to a first aspect there is provided a rotor assembly for a gas turbine engine, the rotor assembly comprising:

a first rotor stage having a first disc portion with a peripheral first rim portion;

a second rotor stage, the second rotor stage having a second disc portion with a peripheral second rim portion, wherein the second rotor stage is axially adjacent and downstream of the first rotor stage and the second rim portion has an axial extension extending towards the first rim portion such that the axial extension of the second rim portion defines a rotor drum cavity between the first and second disc portions, wherein the second rotor stage further comprises a drive arm extending within the drum cavity to the first disc portion, the drive arm being connected to the first disc portion by at least one connector, wherein the drive arm divides the drum cavity into radially outer rim cavity portion and a radially inner main cavity portion, wherein the rotor assembly further comprises a rim seal located between the axial extension of the second rim portion and the first rim portion, wherein the rotor assembly comprises a pressure equalisation path extending from the rim cavity portion to the main cavity portion, and wherein the drive arm comprises an oblique portion extending from a radially inner surface of the axial extension of the second rim portion.

By providing a rim seal between the rim portions and a pressure equalisation path between the rim cavity portion and the main cavity portion, the pressure within the rim cavity portion substantially matches the pressure in the main cavity portion rather than the pressure of the gas path (which is radially outwards of the rim portions). Accordingly, the load applied to the connector(s) is significantly reduced because the lower pressure in the rim cavity no longer imparts a high axial separation pressure load. The connector(s) only have to provide the structural connection between the two rotor stages and no longer have to provide the seal against the pressure in the gas path. This increases the life of the connector(s). It may also reduce the costs and weight associated with the rotor assembly since the number of connectors can be reduced and/or reduced strength (and therefore reduced cost) connector material may be used.

In some embodiments, the drive arm extends from a radially inner surface of the axial extension of the second rim portion. In some embodiments, the drive arm comprises an oblique portion extending obliquely both axially and radially inwards e.g. axially and radially inwards from the radially inner surface of the axial extension.

In some embodiments, the drive arm comprises a radial portion extending from the oblique portion, the radial portion lying in abutment with the first disc portion and wherein the connector(s) extend through the first disc portion and the radial portion of the drive arm.

In some embodiments, the pressure equalisation path is provided through the drive arm. The pressure equalisation path may be provided through the oblique portion of the drive arm. For example, the oblique portion of the drive arm may comprise at least one aperture extending from a radially outer surface (in the rim cavity portion) to a radially inner surface (in the main cavity portion).

The rim seal at least partly seals the rim cavity portion from the gas flow path (which is radially outwards of the rim portions). In some embodiments, the rim seal is adapted to completely seal the rim cavity portion from the gas path. In other embodiments, the rim seal may be adapted allow a controllable leakage.

In some embodiments, the rim seal may comprise a folded sheet seal (e.g. a folded metal sheet seal) having a first leaf in abutment with the first rim portion and a second leaf in abutment with the axial extension of the second rim portion. In some embodiments, the axial extension may have a chamfered edge proximal the first rim portion. In these embodiments, the second leaf may lie in abutment with the chamfered edge.

In some embodiments, the rim seal may comprise an interference seal.

In some embodiments, there is a plurality of connectors, the connectors being circumferentially spaced around the radial portion of the drive arm/first disc portion.

The or at least one of the connectors may be a bolt. The or at least one connection element may be a tie bar or any other suitable connector.

The peripheral rim portions are for receiving the rotor aerofoils. A plurality of aerofoils will be circumferentially arranged around the rim portion. They may be affixed to or integral with the rim portion.

Each rotor stage will comprise a series of circumferentially arranged stators axially downstream of the aerofoil. The stators are preferably cantilevered stators. The stators associated with the first rotor stage will be radially aligned and radially outwards of the axial extension of the second rim portion.

In some embodiments, the rotor assembly is a compressor assembly e.g. a high-pressure compressor assembly and the first rotor stage is a first compressor stage and the second rotor stage is a second (adjacent) compressor stage.

In a second aspect, there is provided a gas turbine engine comprising a rotor assembly or a compressor assembly (e.g. a high-pressure compressor assembly) according to the first aspect.

Accordingly, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational so speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.32, 0.33, 0.34, 0.35, 0.36, 0.37, 0.38, 0.39 or 0.4 (all units in this paragraph being $Jkg^{-1} K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials.

For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 5:
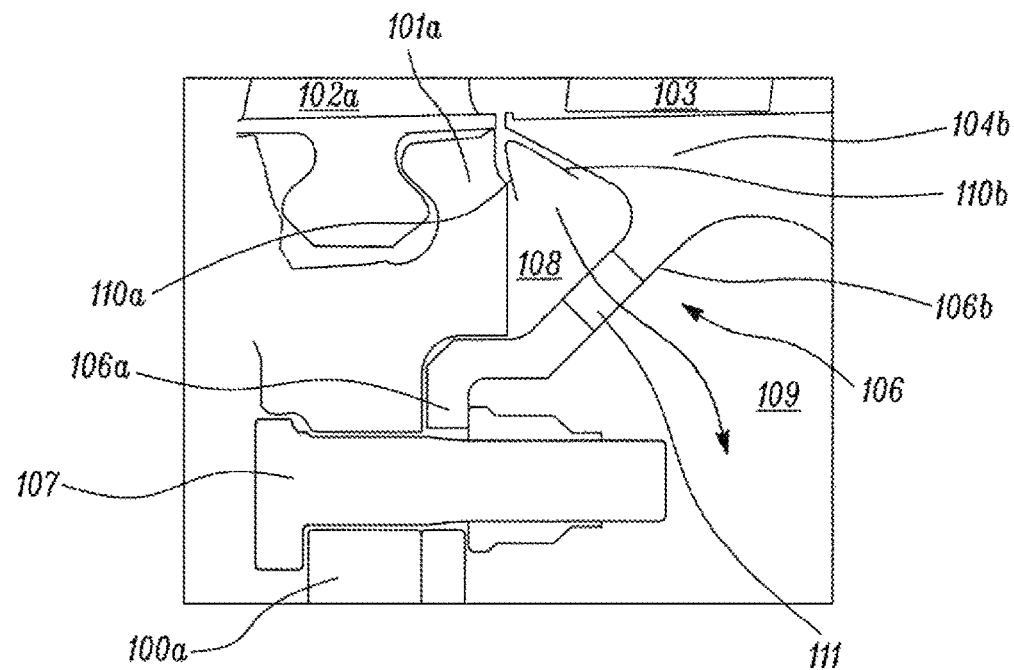
FIG. 5 is a sectional view of a first embodiment.

FIG. 5 shows a first embodiment of a high-pressure compressor assembly comprising a first compressor stage having a first disc portion 100a with a peripheral first rim portion 101a and, axially adjacent and downstream of the first compressor stage, a second compressor stage, the second compressor stage having a second disc portion with a peripheral second rim portion (not shown).

The first rim portion (and the second rim portion) carries a series of circumferentially arranged compressor blades 102a.

The second rim portion has an axial extension 104b extending axially upstream towards the first rim portion 101a. The first compressor stage comprises a series of circumferentially arrange stators 103 which are radially aligned and radially outwards of the axial extension 104 of the second rim portion.

The axial extension 104b defines a compressor drum cavity between the first and second disc portions. The second compressor stage further comprises a drive arm 106 extending from a radially inner surface of the axial extension 104b of the second rim portion within the drum cavity to the first disc portion 100a. The drive arm 106 comprises a radial portion 106a extending from an oblique portion 106b.

The radial portion 106b lies in abutment with the first disc portion 100a and a series of circumferentially arranged bolts 107 extend through the first disc portion 100a and the radial portion 106a of the drive arm 106.

The oblique portion 106b of the drive arm 106 divides the drum cavity into radially outer rim cavity portion 108 and a radially inner main cavity portion 109.

In order to provide a pressure equalisation path from the rim cavity portion 108 to the main cavity portion 109, the oblique portion 106b of the drive arm 106 comprises a plurality of circumferentially spaced apertures 111 extending from a radially outer surface in the rim cavity portion 108 to a radially inner surface in the main cavity portion 109.

The rim cavity 108 houses a rim seal 110 located between the axial extension 104b of the second rim portion and the first rim portion 101a. The rim seal 110 comprises a folded metal sheet seal having a first leaf 110a in abutment with the first rim portion 101a and a second leaf 110b in abutment a chamfered edge of with the axial extension 104b of the second rim portion.

The rim seal 110 and the apertures 111 which provide a pressure equalisation path between the rim cavity portion 108 and the main cavity portion 109, allow the pressure within the rim cavity portion 108 to substantially match the pressure in the main cavity portion 109 rather than the pressure of the gas path (which is radially outwards of the rim portions). Accordingly, the load applied to the bolts 107 is significantly reduced because the lower pressure in the rim cavity 108 no longer imparts a high axial separation pressure load on the bolts 107. The bolts 107 only have to provide the structural connection between the two compressor stages and no longer have to provide the seal against the pressure in the gas path.

Figure 6:
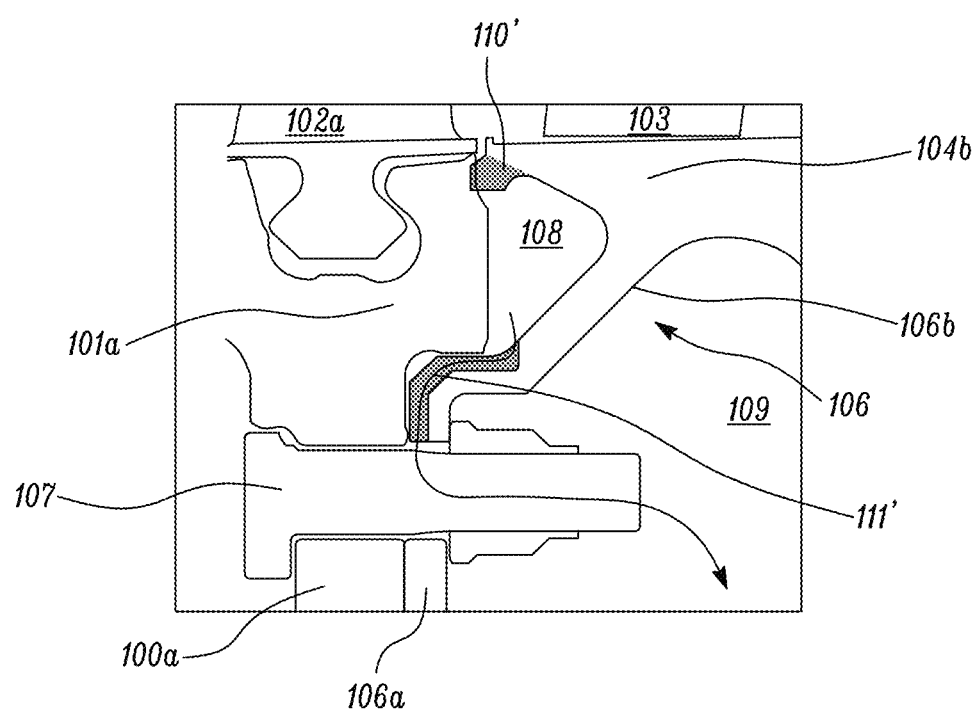
FIG. 6 is a sectional view of a second embodiment.

FIG. 6 shows a second embodiment which is the same as the first embodiment except that the rim seal comprises an interference seal 110 and the pressure equalisation path is provided via the aperture 111'.

Other embodiments (not shown) may combine the rim seal of the first embodiment with the pressure equalisation path of the second and vice versa.

Figure 1:
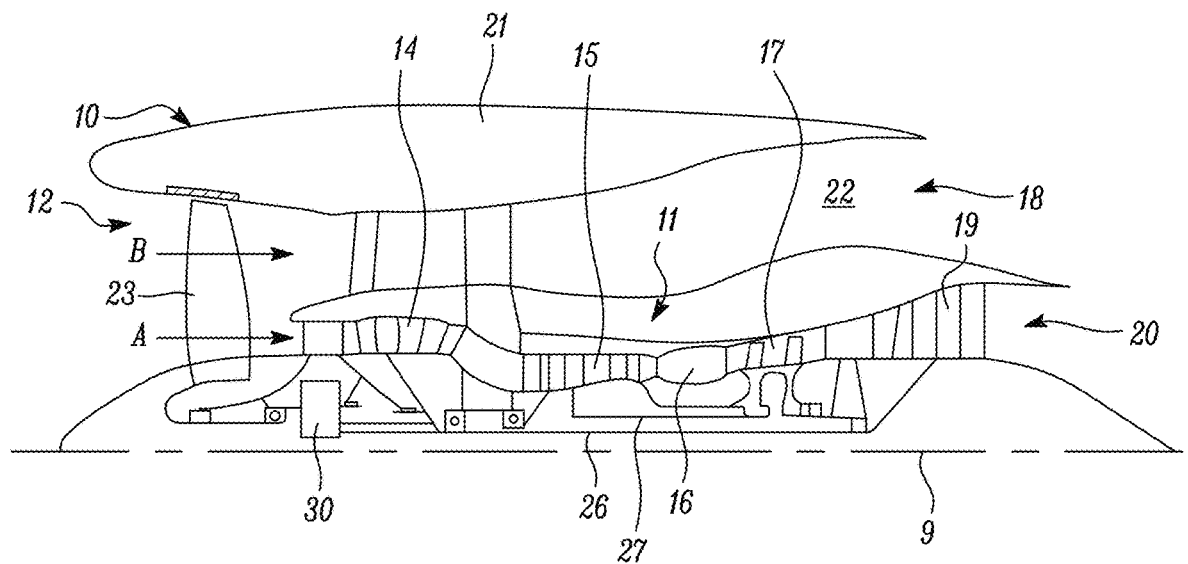
FIG. 1 is a sectional side view of a gas turbine engine.

The compressor assemblies described above are for use in a gas turbine engine such as that shown in FIG. 1 and discussed above.

Such a gas turbine engine 10 may comprise an engine core 11 comprising at least one turbine 17, 19, a combustor 16, at least one compressor 14, 15 which each comprise a compressor assembly as described above, and a core shaft 26. Such a gas turbine engine may comprise a fan 23 (having fan blades) located upstream of the engine core 11.

Arrangements of the present disclosure may be particularly, although not exclusively, beneficial for fans 23 that are driven via a gearbox 30. Accordingly, the gas turbine engine may comprise a gearbox 30 that receives an input from the core shaft 26 and outputs drive to the fan 23 so as to drive the fan 23 at a lower rotational speed than the core shaft 26. The input to the gearbox 30 may be directly from the core shaft 26, or indirectly from the core shaft 26, for example via a spur shaft and/or gear.

Figure 2:
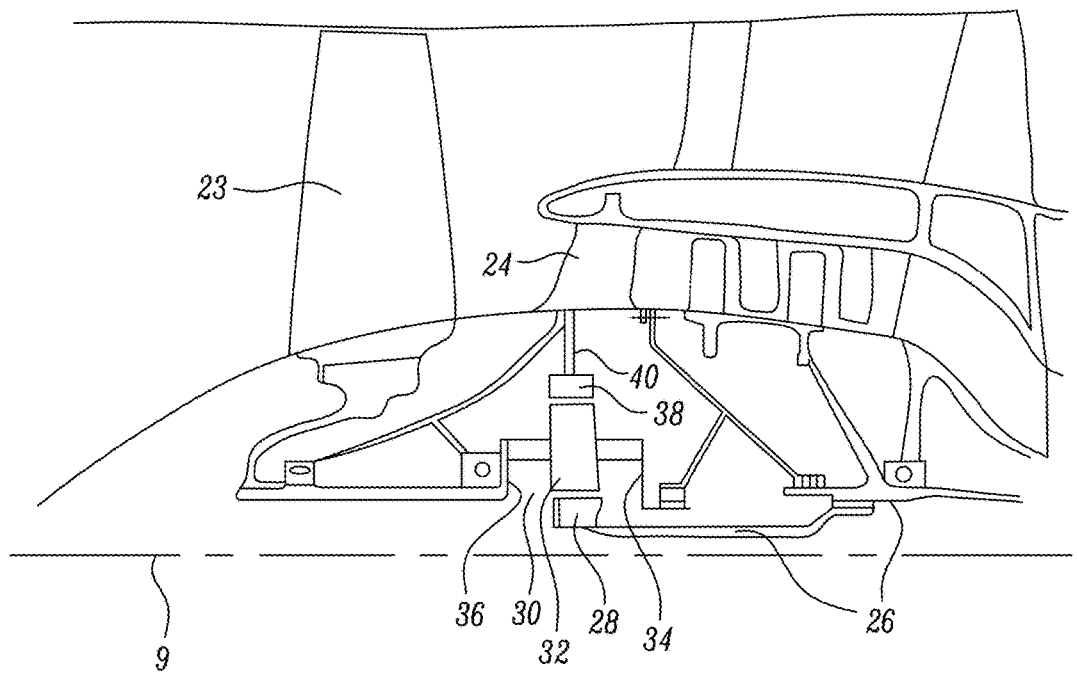
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
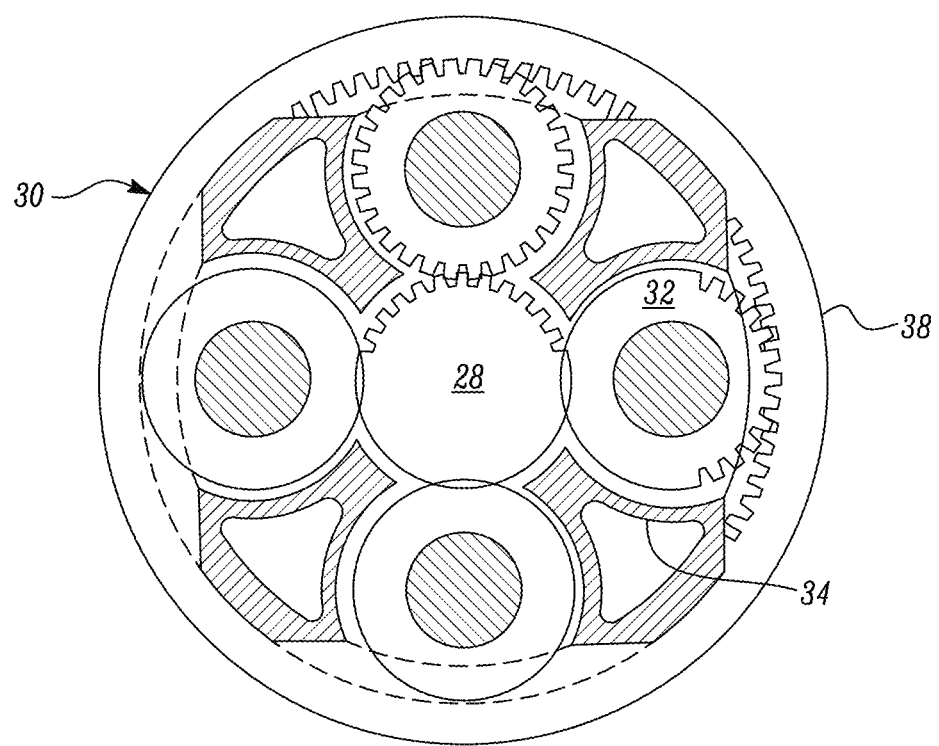
FIG. 3 is a partially cut-away view of a gearbox for a gas turbine engine.
Figure 4:
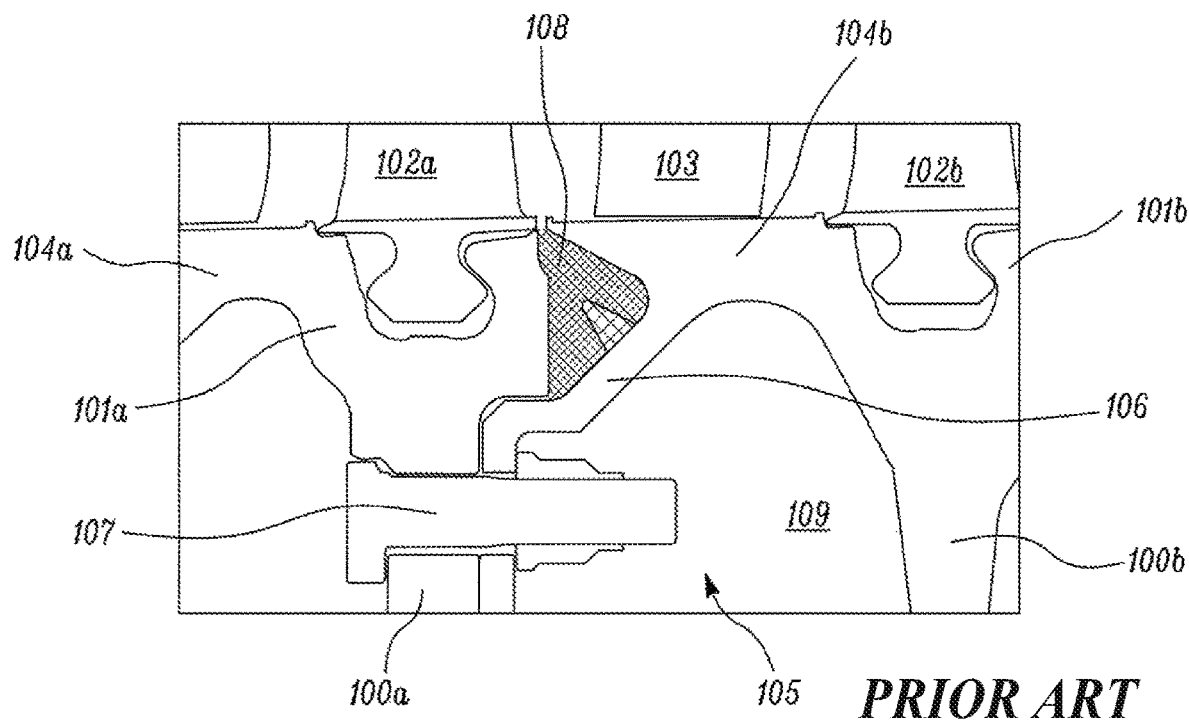
FIG. 4 is a sectional view of a prior art compressor assembly.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A rotor assembly for a gas turbine engine, the rotor assembly comprising:
    a first rotor stage having a first disc portion with a peripheral first rim portion;
    a second rotor stage, the second rotor stage having a second disc portion with a peripheral second rim portion,
    wherein the second rotor stage is axially adjacent and downstream of the first rotor stage and the second rim portion has an axial extension extending towards the first rim portion such that a terminal end of the axial extension is adjacent the peripheral first rim portion, the axial extension of the second rim portion defining a rotor drum cavity between the first and second disc portions, the rotor drum cavity being located radially inward of the axial extension,
    wherein the second rotor stage further comprises a drive arm depending radially inward from the axial extension and extending radially inwardly within the drum cavity to the first disc portion, the drive arm being connected to the first disc portion by at least one connector, wherein the drive arm divides the drum cavity into radially outer rim cavity portion and a radially inner main cavity portion, the radially outer rim cavity portion being located between a radially inwardly facing surface of the axial extension and a radially outwardly facing surface of the drive arm, the at least one connector being located radially inwardly of the radially outer rim cavity portion and the drive arm and extending into the radially inner main cavity portion,
    wherein the rotor assembly further comprises a rim seal located between the axial extension of the second rim portion and the first rim portion,
    wherein the rotor assembly comprises a pressure equalisation path extending from the rim cavity portion to the main cavity portion,
    wherein the drive arm comprises an angled portion and a radial portion, the angled portion extending radially inwardly and axially forward from the radially inwardly facing surface of the axial extension to the radial portion, and
    wherein the radial portion is located radially inward of and extending away from the angled portion, and is located axially forward of an axially aft-most facing surface of the peripheral rim portion of the first rotor stage, the axial aft-most facing surface of the peripheral rim portion being located radially outwardly of the radial portion of the drive arm and being located adjacent to the terminal end of the axial extension of second rotor stage.

2. The assembly according to claim 1, wherein the pressure equalisation path is provided through the drive arm.

3. The assembly according to claim 1, wherein the angled portion of the drive arm comprises at least one aperture extending from the radially outwardly facing surface in the rim cavity portion to a radially inner surface in the main cavity portion.

4. The assembly according to claim 1, wherein the rim seal is a folded sheet seal having a first leaf and a second leaf, wherein the first leaf is in abutment with a first axially aft facing surface of the first rim portion located radially outwardly of the drive arm, and wherein the second leaf is in abutment with the radially inner surface of the axial extension of the second rim portion.

5. The assembly according to claim 1, wherein the rim seal is an interference seal.

6. The assembly according to claim 1, wherein the rotor assembly is a compressor assembly and the first rotor stage is a first compressor stage and the second rotor stage is a second, adjacent compressor stage.

7. A gas turbine engine comprising a rotor assembly according to claim 1, wherein the rotor assembly is configured to operate as a compressor assembly.

8. The assembly of claim 1, wherein the radial portion extends entirely radially along an axially aft facing surface of the first disc portion.

9. A rotor assembly for a gas turbine engine, the rotor assembly comprising:
    a first rotor stage having a first disc portion with a peripheral first rim portion;
    a second rotor stage, the second rotor stage having a second disc portion with a peripheral second rim portion, the second rotor stage including a plurality of blades arranged circumferentially about the second disc portion,
    wherein the second rotor stage is axially adjacent and downstream of the first rotor stage and the second rim portion has an axial extension extending towards the first rim portion such that a terminal end of the axial extension is adjacent the peripheral first rim portion, the axial extension defining a rotor drum cavity between the first and second disc portions, the rotor drum cavity being located radially inward of the axial extension,
    wherein the second rotor stage further comprises a drive arm coupled directly to the axial extension and extending radially inward away from the axial extension and extending radially inwardly within the drum cavity to the first disc portion, wherein an entirety of the drive arm is arranged axially forward of the plurality of blades of the second rotor stage, wherein the drive arm is connected to the first disc portion by at least one connector, wherein the drive arm divides the drum cavity into radially outer rim cavity portion and a radially inner main cavity portion, the radially outer rim cavity portion being located between a radially inwardly facing surface of the axial extension and a radially outwardly facing surface of the drive arm, the at least one connector being located radially inwardly of the radially outer rim cavity portion and the drive arm and extending into the radially inner main cavity portion, wherein the rotor assembly further comprises a rim seal located between the axial extension of the second rim portion and the first rim portion, wherein the rotor assembly further comprises a pressure equalisation path extending from the rim cavity portion to the main cavity portion, wherein the at least one connector is a bolt extending through the first rotor stage and the drive arm so as to couple the second rotor stage to the first rotor stage, and wherein the terminal end of the axial extension is located axially forward of at least a portion of the at least one bolt.

10. The assembly according to claim 9, wherein the pressure equalisation path is provided through the drive arm.

11. The assembly according to claim 9, wherein an angled portion of the drive arm comprises at least one aperture extending from a radially outer surface in the rim cavity portion to a radially inner surface in the main cavity portion.

12. The assembly according to claim 9, wherein the rim seal is a folded sheet seal having a first leaf and a second leaf, wherein the first leaf is in abutment with a first axially aft facing surface of the first rim portion located radially outwardly of the drive arm, and wherein the second leaf is in abutment with the radially inner surface of the axial extension of the second rim portion.

13. The assembly according to claim 9, wherein the drive arm further comprises a radial portion extending radially inwardly of an angled portion, and wherein the radial portion extends entirely radially along an axially aft facing surface of the first disc portion.

14. The assembly according to claim 9, wherein the rotor assembly is a compressor assembly and the first rotor stage is a first compressor stage and the second rotor stage is a second, adjacent compressor stage.

15. A gas turbine engine, comprising:
a first rotor stage having a first disc portion with a peripheral first rim portion;
a second rotor stage, the second rotor stage having a second disc portion with a peripheral second rim portion, the second rotor stage including a plurality of blades arranged circumferentially about the second disc portion; and
a vane stage arranged axially between the first and second rotor stages and including at least one vane,
wherein the second rotor stage is axially adjacent and downstream of the first rotor stage and the second rim portion has an axial extension extending towards the first rim portion such that a terminal end of the axial extension is adjacent the peripheral first rim portion, the terminal end of the axial extension being located axially forward of the at least one vane of the vane stage, the axial extension defining a rotor drum cavity between the first and second disc portions, the rotor drum cavity being located radially inward of the axial extension,
wherein the second rotor stage further comprises a drive arm coupled directly to the axial extension and extending radially inward away from the axial extension and extending radially inwardly within the drum cavity to the first disc portion, wherein an entirety of the drive arm is arranged axially forward of the plurality of blades of the second rotor stage, wherein the drive arm is connected to the first disc portion by at least one connector, wherein the drive arm divides the drum cavity into radially outer rim cavity portion and a radially inner main cavity portion, the radially outer rim cavity portion being located between a radially inwardly facing surface of the axial extension and a radially outwardly facing surface of the drive arm, the at least one connector being located radially inwardly of the radially outer rim cavity portion and the drive arm and extending into the radially inner main cavity portion,
wherein the rotor assembly further comprises a rim seal located between the axial extension of the second rim portion and the first rim portion, and
wherein the rotor assembly comprises a pressure equalisation path extending from the rim cavity portion to the main cavity portion.

16. The gas turbine engine according to claim 15, wherein the rim seal is a folded sheet seal having a first leaf and a second leaf, wherein the first leaf is in abutment with a first axially aft facing surface of the first rim portion located radially outwardly of the drive arm, and wherein the second leaf is in abutment with the radially inner surface of the axial extension of the second rim portion.

* * * * *